United States Patent [19]

Cheng

[11] 3,978,661

[45] Sept. 7, 1976

[54] PARALLEL-COMPOUND DUAL-FLUID HEAT ENGINE

[75] Inventor: Dah Yu Cheng, Palo Alto, Calif.

[73] Assignee: International Power Technology, Palo Alto, Calif.

[22] Filed: Dec. 19, 1974

[21] Appl. No.: 534,479

[52] U.S. Cl. .......... 60/39.55; 60/39.5; 60/39.53

[51] Int. Cl.² .......... F02C 7/10; F02C 7/00

[58] Field of Search .......... 60/39.55, 39.05, 39.18 B, 60/39.52, 39.02, 39.53, 39.19; 431/4, 190

[56] References Cited

UNITED STATES PATENTS

| | | | |
|---|---|---|---|
| 1,278,314 | 9/1918 | Dix | 60/39.55 |
| 1,824,893 | 9/1931 | Holzwarth | 60/39.54 |
| 1,988,456 | 1/1935 | Lysholm | 60/39.55 |
| 2,469,678 | 5/1949 | Wyman | 60/39.28 R |
| 2,744,383 | 5/1956 | Sedille | 60/39.15 |
| 2,995,895 | 8/1961 | Howes | 60/39.55 |
| 3,013,383 | 12/1961 | Malick | 60/39.05 |
| 3,038,308 | 6/1962 | Fuller | 60/39.55 |
| 3,238,719 | 3/1966 | Harslem | 60/39.55 |
| 3,657,879 | 4/1972 | Ewbank | 60/39.05 |
| 3,708,976 | 1/1973 | Berlyn | 60/39.05 |
| 3,731,485 | 5/1973 | Rudolph | 60/39.05 |
| 3,854,283 | 12/1974 | Stirling | 60/39.18 B |

OTHER PUBLICATIONS

Baumeister & Marks, *Mechanical Engineer's Handbook*, McGraw-Hill, Inc., 1958, pp. 9–124.

*Primary Examiner*—Carlton R. Croyle
*Assistant Examiner*—L. J. Casaregola
*Attorney, Agent, or Firm*—Limbach, Limbach & Sutton

[57] ABSTRACT

A heat engine provides work output from a first working fluid operating in essentially a Brayton-type thermodynamic cycle and from a second working fluid operating essentially in a Rankine-type thermodynamic cycle, the two working fluids interacting with each other so that the work output of the two working fluids, working in parallel during the conversion of heat energy to work, is compounded.

12 Claims, 9 Drawing Figures

PARALLEL-COMPOUND DUAL-FLUID HEAT ENGINE

BACKGROUND OF THE INVENTION

The present invention relates to heat engines and more particularly to heat engines having a dual working-fluid, parallel-compound thermodynamic cycle with improved thermal efficiency and simplicity.

It is well known that the Carnot cycle is a hypothetical thermodynamic cycle used as a standard of comparison for heat engine cycles such as the Brayton, Rankine, Otto and Diesel. This cycle shows theoretically that even under ideal conditions a heat engine cannot convert all the heat energy supplied to it into mechanical energy. Some of the energy must be rejected as waste or exhaust heat. The maximum efficiency of the Carnot cycle is given by:

$$\text{Efficiency}_{Carnot} = 1 - T_2/T_1.$$

Here, $T_1$ is the maximum engine cycle temperature and $T_2$ is the temperature of the working fluid after extracting the engine work. To improve the cycle efficiency, one can increase $T_1$ and/or lower $T_2$. In other words, the greater the temperature ratio between the source and sink, the greater the engine efficiency.

Increasing $T_1$ sooner or later is limited by the strength and durability of materials in high temperature environment. The lower limit of $T_2$ under normal conditions is the ambient temperature. Current heat engines do not generally push $T_2$ towards ambient temperature. Only the combined cycle engine, combining Brayton and Rankine cycles in series such that the Rankine cycle is operated by the temperature difference between the exhaust temperature most nearly accomplishes the objective of high temperature operation between source heat and sink temperature of the Brayton cycle and the ambient temperature. These types of cycles are summarized subsequently. Lower $T_2$ temperature enables the use of high expansion pressure ratios, hence greater mechanical work extraction.

In conventional heat engines, the working fluid must be compressed to high pressures before heat energy is added to the working fluid. The heated working fluid is then expanded through an expander to convert the added heat energy into mechanical work. The net mechanical work output is the heat energy converted to mechanical work minus the mechanical work required to compress the working fluid, minus any heat losses in the system. It is to the advantage of an engine system to use as little compression work as possible.

This is possible in a liquid-vapor system since liquid is almost an incompressible fluid. To compress a liquid (for example, water, freon, or mercury) to 3,000 psia requires a small, practically negligible amount of energy in comparison with the energy required to compress a comparable mass of a gas, for example, air.

The Rankine thermodynamic cycle, typified by the conventional steam engine, takes advantage of phase change of a fluid between the liquid and vapor phases to minimize the compression work. However, this change of phase requires additional energy to overcome the latent heat of vaporization of the fluid. And, after expansion, a large amount of heat has to be absorbed from the working fluid just to convert the vapor back into a liquid. This is done in a closed loop cycle where the same working fluid is recycled continually through the cycle. The alternative is to simply exhaust the vaporized working fluid and not attempt to convert it back into a liquid. This is what is done in an open loop cycle. Hence, to optimize a working cycle, the mechanical work to compress the working fluid should be minimized and the latent heat of evaporation should also be made as small a part of the total energy used to heat the gas as possible.

Several thermodynamic cycles can be characterized as gascycle engines since the working fluid is in the gaseous or vapor form. Brayton, Otto and Diesel cycles are examples of gas-cycle engines.

The Brayton cycle consists ideally of two constant-pressure (isobaric) processes interspersed with two reversible adiabatic (isentropic) processes. Of course, no actual engine is capable of perfect isobaric or adiabatic processes since there are always irreversible losses.

The Brayton cycle is most commonly exemplified in the gas turbine engine, where compression and expansion devices handle the large volumes of working fluid. The self-contained gas turbine basically is a steady-flow device with a compressor, a combustion chamber or other heating mechanism where heat is added, and an expander element. The expander can take the form, for example, of a turbine, multiple piston or Wankel arrangement. Each of the phases of the cycle except the expander is accomplished with steady flow in its own mechanism rather than intermittently, as with the piston and cylinder mechanism of the usual Otto and Diesel cycle engines. Where the expander is a turbine, it, too, is accomplished with steady flow.

Currently, air and other gases are used as the working fluid for internal combustion cycles, including the Brayton cycle, and liquids which vaporize at appropriate engine cycle temperatures, such as water, freon, or mercury, are typically used in external combustion cycles of the Rankine cycle type. Some comparisons of the two cycles can be seen as follows:

COMPARISON OF GAS (BRAYTON) AND LIQUID-VAPOR (RANKINE) ENGINE CYCLES

TABLE I.

Current Status of Typical Engine Cycles

| | Gas-Brayton | LIQUID-VAPOR (Steam) Rankine |
|---|---|---|
| 1. Compression work | High | Low |
| 2. Heat of evaporation | None | High |
| 3. Heat addition | Limited by materials of the engine (Such as turbine inlet temperature) | Generally limited by pressures created through super-heating of working fluid |
| 4. Heat addition method | Internal, direct (majority) | External, indirect heating |
| a) Specific heat transfer rate | Very high | Low, requires large surface area boiler |
| b) Chemical reaction with the working fluid and fuel | Yes | No |
| 5. Pressure ratio | Low | High to very high |
| 6. Exhaust heat regeneration | Difficult, not economical in high pressure ratio engines | Not available |
| 7. Reheating | Somtimes, but not economical | Frequently done |
| 8. Exhaust temperature | High | Low to very low |
| 9. Exhaust pressure | Higher than ambient | Vacuum - 0.5 inch Hg. |
| 10. Heat rejection method | Simple via exhaust gas | Condenser, large but can do without it |
| 11. Typical upper | 33–35% | 38–40% (steam |

TABLE I.-continued

| Current Status of Typical Engine Cycles | Gas-Brayton | LIQUID-VAPOR (Steam) Rankine |
|---|---|---|
| efficiency | | central power plants) |

A comparison of the current conditions for today's typical engines is given in the following Table II.

TABLE II

| | Spark Ignition (Otto) | Auto Ignition (Diesel) | Gas turbine (Brayton) | Steam Cycle (Rankine) |
|---|---|---|---|---|
| Compression Ratio | 8:1 | 19:1 | 25:1 | >90,000:1 |
| Compressor Exit temp. | ~550°F | ~700°F | ~800°F | ~100°F |
| Upper temp. $T_1$ | ~5500°F | ~5500°F | ~1800°F with uncooled nozzle buckets. For 2500°F turbine temperature special cooling is required. | ~1000°F or lower |
| Efficiency | ~26% | ~33% | ~35% | ~40% |
| Exhaust temp. | >1800°F | >1500°F | >950°F | >100°F |

As one can see in Table II the Rankine cycle upper temperature is comparable to the exhaust temperature of most gas cycles. A combination of the Brayton cycle and Rankine cycle can be used in series to recover the waste heat from the single Brayton cycle operation. Such a combination of the Brayton and Rankine cycles is called the combined-cycle engine.

Gas turbines (Brayton) and steam (Rankine) engines each have their own advantages and disadvantages, which are discussed in the following paragraphs. A combined cycle engine is also described.

GAS (BRAYTON) CYCLE-LIMITATIONS

1. In a steady pressure, continuous combustion engine, such as the gas turbine, not all the oxygen content in air is used to burn with the fuel. Much of the air has to be used for dilution so that the engine's materials heat limitations are not exceeded. With the present state-of-the art, the temperature limits are at about 1800°F without additional cooling methods for turbine nozzles and blades. Temperatures as high as 2500°F have been demonstrated using air bled from the compressor discharge for film cooling of the first few stages of nozzles and turbines. This cycle requires approximately 350% theoretical air (stoichiometric mixture) necessary to sustain 1800°F operation and approximately 200% theoretical air to sustain 2500°F operation.

2. The compression ratio is limited. A high compression ratio requires a great deal of compressor work which results in a high compressor exit temperature unless compressor interstage cooling is used. The high exit temperature from the compressor leaves little room to add heat to the flow stream without exceeding material tolerance limits. The result is a lower thermal efficiency at an unacceptably high pressure ratio as can be seen by reference to FIG. 16, Chapter 7, *Principle of Jet Propulsion*, by M. J. Zucrow, John Wiley and Sons, Inc., New York, 1952. If the engine has a high pressure ratio resulting in a high compressor exit temperature and low turbine exhaust temperature, the practical need for heat regeneration (recuperating exhaust heat) is essentially eliminated.

In general, there is an optimum pressure ratio for a given turbine inlet temperature. With state-of-the-art gas turbines, the compression ratio does not exceed 25:1. The highest current production line engines have compression ratios of about 23:1. A majority of aircraft gas turbines have compression ratios of less than about 20:1 and have uncooled turbines operating at or below about 1800°F.

For example, with an inlet temperature of 80°F, a 12:1 pressure ratio Brayton cycle engine with current state-of-the-art compressor efficiency has a compressor exit temperature of approximately 632°F, and a 25:1 pressure ratio has an exit temperature of approximately 880°F. At one atmospheric pressure and an 80°F inlet temperature, a 12:1 pressure ratio requires about 211 hp to compress each pound per second of the gas, and a 25:1 pressure ratio requires approximately 295 hp to compress each pound per second of the gas. Because of material temperature limitations, the allowable energy input in the form of heat, expressed in equivalent horsepower units for each of these conditions, is: (a) roughly 325 hp for 25:1 pressure ratio, and 413 hp for 12:1 pressure ratio if the maximum temperature is limited to 1800°F, and (b) 573 hp for a 25:1 pressure ratio and 661 hp for a 12:1 pressure ratio for a 2500°F upper temperature. This means the ratios of heat input to compression work are:

TABLE III.

| Heat Input/Compression Work Ratio | | |
|---|---|---|
| | Pressure Ratio | |
| Temp. | 12:1 | 25:1 |
| 1800°F | 1.96 | 1.10 |
| 2500°F | 3.13 | 1.94 |

At the limiting ratio of 1.0 all of the turbine work must be used to drive the compressor and the net work output efficiency drops to zero. Obviously, 1800°F turbine inlet temperature and 25:1 compression ratio do not provide practical operational conditions, particularly since real compressor and turbine efficiencies are in the range of 75 ~ 90 percent.

3. Low compression-ratio engines produce relatively little net work output from the turbine for the size and complexity of the machinery required. Consequently, practical engines for producing mechanical work or power generally operate above 12:1 pressure ratio.

4. The compressor efficiency is low (less than 80%) for small size rotary compressors (axial flow, centrifugal or compound compressors), due to mechanical fit (leakage) and boundary layer losses. Engines of the gas turbine type usually must be 200 hp or larger.

5. It is possible to improve the overall efficiency of a gas turbine engine by using heat exchangers, called regenerators or recuperators, to recover some of the otherwise wasted exhaust heat. Such recuperators heat the working fluid before, during or after compression to reduce the amount of heat required to be added by combustion. Since compression heats the working fluid, thus limiting the temperature difference between turbine inlet and compressor outlet (or interstage), recuperators require large heat exchange surface, and therefore tend to be large and heavy. Recuperators tend also to limit compression ratio because a high pressure ratio will decrease the temperature difference between turbine inlet and compressor outlet, and thus they affect efficiency adversely in this respect. Because of these effects, only limited success has been achieved to date in applying gas turbine regenerators for vehicle or aircraft use.

6. Tight mechanical tolerances have to be maintained in order to make any engine work. Gas turbine thermal efficiency also falls off for engines of 200 hp or less for this class, because of problems of mechanical fit and flow distortion due to boundary layer effects in flow passages of small dimensions.

GAS VAPOR (BRAYTON CYCLE — ADVANTAGES

1. Gas turbine engines usually operate open cycle, therefore they do not require that the working fluid be carried with the engine.

2. For internal combustion engines heat is transferred to the working fluid directly by means of turbulent mixing and chemical reaction.

3. Gas turbine engine systems are responsive to load adjustment, having short startup and shutdown time.

LIQUID VAPOR (RANKINE) CYCLE LIMITATIONS

1. The Rankine cycle engine generally operates at much lower maximum temperature. Presently, the highest operational temperature for a steam engine, for example, is about 1000°F; yet it has higher thermal efficiency than other cycles because the rejection temperature is very close to the ambient temperature. This is possible because the compression of water to high pressures is simple and not very energy consuming. The major problem with the steam cycle is in the way heat is transferred to the steam. High temperature boiler tube materials able to confine the high pressure working fluid are thick-walled and low in heat conductivity. Also low pressure combustion products flowing through banks of such tubes create thick thermal boundary layers. Thus, the overall heat transfer coefficient is low.

2. Heat transfer to liquid water is very efficient as long as it stays as a liquid, e.g. the heat conductivity $\lambda \simeq 0.384$ Btu/hr-ft/°F. It becomes poor when it becomes steam, e.g. $\lambda \simeq 0.024$ Btu/hr-ft/°F. The heat capacity of water is 1 Btu/°F/lb. and for steam it is approximately 0.5 Btu/°F/lb. To transfer this combustion energy to the working fluid therefore requires huge boilers. Not only does the surface area have to be large but also not all the combustion energy can be transferred to the working fluid. The passage of relatively hot heating gases into the stack and other losses limit the overall thermal efficiency of the system.

3. The boiler is bulky and heavy, so that it is not a very portable engine. As an example, a steam locomotive, which weighs many tons, produces only 1,000 hp. Current day gas turbine engines of 1,000 hp typically weigh only about 400 lbs.

4. Hard water can form scales in high-temperature boiler tubes. It is generally necessary to treat or condition the water.

5. The latent heat of evaporation is high. The heat available to do work is less accordingly.

6. Since the large quantity of steam energy at low temperature is in the form of the latent heat, and since the high pressure ratio tends to form wet steam in the turbine, it is generally advantageous to use reheating to superheat the steam again. Recuperating exhaust heat is not possible due to its low exhaust temperature.

7. Large thermal lag results in long startup and shutdown time.

LIQUID VAPOR (RANKINE) CYCLE — ADVANTAGES

1. Low compression work.

2. The heat content per pound in the vapor phase is high, resulting in higher power density. For example, steam has a specific heat at constant pressure of 0.5 Btu/°F/lb. or greater. On the other hand, the specific heat at constant pressure for air is only 0.25 Btu/°F/lb. or less.

3. An extremely high pressure ratio can be used across the expander to produce high mechanical work output in a single path.

4. Low exhaust temperature at the end of the cycle.

COMBINED (SERIAL) CYCLE ENGINE SYSTEM

From the above description of the Brayton and Rankine cycles, it is apparent that a combination of the two cycles can to some extent compensate for some of the disadvantages of both. A combined cycle system typically utilizes the heat of the exhaust gas from a gas cycle engine to heat the steam boiler of a Rankine (liquid-vapor) cycle engine system such that the heat rejection of the overall cycle system can be close to the ambient temperature. Present systems of this type have overall heat conversion efficiencies which range to about 40%.

A serious limitation of the combined cycle system in series, however, is that it does not enable the Brayton cycle part to operate at any higher pressure ratio or the Rankine cycle part to operate at any higher temperatures. This is because the two cycles in series do not solve the difficulties of the cycles operated individually. For example, such systems exhibit extremely poor partial load performance. The combined cycle does push the efficiency higher than the individual cycles operating separately but at the expense of having to provide two entire engine systems.

SUMMARY OF THE INVENTION

It is therefore an object of the invention to provide an improved heat engine.

Another object of the invention is to provide an improved heat engine having two working fluids combining, in parallel, Brayton and Rankine cycles.

Another object of the invention is to provide an improved heat engine combining advantages of Brayton and Rankine cycle engines while eliminating disadvantages.

Another object of the invention is to provide a heat engine having high thermal efficiencies by pushing beyond the practical operating pressure ratio of the Brayton cycle and beyond the practical operating temperature of a Rankine cycle.

Yet another object of the invention is to provide an engine having long life and reasonable manufacturing costs in comparison with present engines.

Another object of the invention is to provide an engine that inherently has the characteristic of producing exhaust with low atmospheric pollution levels.

Another object of the invention is to utilize the high temperature difference between the engine exhaust and one of the working fluids after it has been compressed to recuperate exhaust heat in a very efficient manner and without having to lower the engine pressure ratio.

In accordance with the present invention, an improved heat engine provides work output from a first working fluid operating essentially in a Brayton thermodynamic cycle and from a second working fluid operating essentially in a Rankine thermodynamic cycle, the two working fluids interacting with each other so that the two working fluids follow parallel paths and the work output from the two working fluids is compounded.

The first working fluid is under normal temperature and pressures. It can be a single gas, such as oxygen, nitrogen, carbon dioxide, or carbon monoxide, or a combination of gases or a gaseous mixture. These gases either exist in air or can result from combustion of a fuel with air.

The second fluid, under normal temperature and pressure conditions, is in the liquid phase of its thermodynamic state. It can be composed of a single fluid, or a mixture of two or more fluids. For example, such fluids include water, methanol, freon, ethanol, carbon tetrachloride, acetone, mercury, organic oils and any dissolvable solids in a carrier fluid.

The first working fluid, in the gaseous state, follows the open cycle of a gas turbine. The second working fluid, typically water, follows a partially closed cycle analogous to the liquidvapor cycle of the steam heat engine or, as will be seen, it can be operated also in an open cycle. Many of the advantages of both cycles are utilized and many of the disadvantages and limitations of both cycles are avoided.

Basic to the operation of the parallel, compound thermodynamic cycle of the present invention is the utilization of the two working fluids in interaction with each other. The first working fluid, typically air, is compressed and then introduced within a combustion chamber where combustion with a fuel takes place. The second working fluid, normally water, is heated typically in a combustion chamber and by rapid and turbulent mixing with the heated combustion products and air, absorbs heat from the first working fluid to change the second working fluid to superheated vapor. The energized mixture of combined working fluids enters expanders or turbines to convert thermal energy into mechanical work.

If air and its attendant fuel combustion products are used as the first working fluid and if water is used as the second working fluid, then after the turbulent mixing with the heated combustion products the majority of the thermal energy content resides in the steam, rather than the combustion product gas. In fact, under the most efficient operating situations the steam energy content substantially exceeds the gas energy content, and the cycle "mix" can be extended to an upper limit where air is used only to burn fuel in order to transfer combustion energy in the cycle to water (steam) with only minor participation of the air in energy output. Steam at the same temperature as air-combustion products contains almost twice as much energy per pound, therefore lowering the upper temperature required for the same Btu content per pound of a gas mixture. With the same temperature limit on engine materials, the power density (hp/lb) throughput accordingly is higher.

This use of water as the principal working fluid is in contrast to the practice of water injection in gas turbine engines. It is not an uncommon practice to inject water into gas turbines to temporarily increase engine power, such as to augment thrust of aircraft engines, for example, during take-off. Current gas turbine engines inject up to 4% water in short bursts during take-off. However, where this is done, the basic Brayton cycle remains unchanged in principle. See NACA Report No. TR-981, entitled "Theoretical Analysis of Various Thrust-Augmentation Cycles for Turbojet Engines", by B. L. Lundin, 1950. For example, excess air is still used and the air and air products do most of the turbine work to drive the compressor and the output work. The essentially equal mass flow in a gas turbine limits the amount of mass addition which can be added after the compressor stage due to compressor surge. This is more so in high performance engines of today where the design points are closer to the surge line.

The water addition creates high back pressure for the compressor, and eventually leads the compressor to stall. Therefore, comparatively small amounts of water are injected to augment mass flow and the basic gas turbine, Brayton cycle is unaffected. This is theoretically limited to about a 10% mass flow rate as reported in the NACA Report No. TR-981 referred to above and experimentally verified in Aeronautical Turbine Laboratory Report NATTS-ATL-51, entitled "Determination of Causes of Engine Failure Incurred in Service Operation of F3H-2N Aircraft," U.S. Naval Air Turbine Test Station, February 1961.

By heating the second working fluid directly through turbulent mixing with the first working fluid the heat exchanger (boiler) required in the conventional, external, Rankine cycle engine is eliminated. Not only does this reduce the overall bulk and weight of the engine but, for a steam cycle, it permits a dramatic increase in the upper temperature, which is limited to around 1000°F in state-of-the-art steam engines because of pressure limitations. As a result of removing the upper temperature limitation, the latent heat of evaporation becomes a small portion of the heat content. Thus, the cycle can operate at as high a temperature as the choice of expander material allows, from 1800°F – 2500°F with turbine materials available today. This is much above current steam engines and comparable to the turbine inlet temperatures of a gas turbine engine.

Also, unlike the situation of a heat exchanger (external combustion boiler) with its attendant stack gas heat losses, the heat transfer by mixing is very efficient, therefore the cycle recovers virtually all of the combustion energy to transfer it to the working fluid.

As explained previously, typical gas turbines require much greater volumes of air than necessary to support combustion in order to keep the engine expander inlet temperature below that which the materials can tolerate. For an air combustion engine, for example, stoichiometric combination of the total air and fuel is never achieved in a typical turbine engine because excess air is required to limit the turbine inlet temperatures. In accordance with the present invention, the introduction of a liquid (water) within or just after the combustion chamber acts to lower the combustion products temperature. This has several important advantages; namely it permits stoichiometric, or nearly stoichiometric, air-fuel burning mixtures and, along with the lower turbine inlet temperatures, minimizes the production of oxides of nitrogen ($NO_x$), which are undesirable air pollutants produced in high temperature combustion reactions with air.

Another important aspect of the present invention resides in the manner of recuperating or regenerating the exhaust energy of the mixture of working fluids. This is accomplished by using the liquid (second) working fluid before it enters the combustion chamber (heater) as the means for removing some of the residual thermal energy from the working fluid mixture. This method of heat recovery should be contrasted with usual gas turbine regeneration where unused thermal energy is transferred to the incoming gaseous working fluid in bulky and comparatively inefficient gas-phase heat exchangers. A liquid is far better than a gas for this purpose because of its better heat transfer capability and its inherent capacity to store greater amounts of heat per pound than, say, air or combustion products. Also, the latent heat of evaporation of liquids can be utilized to absorb exhaust heat without unduly increasing the temperature of the liquid-vapor fluid. Thus, further reduction in heat exchanger size can be achieved.

The heat engine of the present invention is different from the gas turbine engine since only one of the working fluids, namely, the second (liquid) working fluid, is used to recuperate exhaust waste heat and the second working fluid flow rate is somewhat independent of the first working fluid. Therefore, the cycle can be operated at essentially constant turbine inlet temperature under a partial load. Only the compression pressure ratio of the first working fluid is varied under partial load so that the efficiency does not drop sharply in this cycle when the engine is operated under partial load as it does in a gas turbine cycle. The technical reason for this will be disclosed subsequently.

The engine of the present invention differs from the combined (serial) cycle engine both in the principle of its thermodynamic cycle, and in its performance (heat energy conversion efficiency) potential. In contrast to the combined-cycle engine, which operates Brayton-and-Rankine-cycle systems in series, the engine which constitutes this invention operates uniquely with Brayton-and-Rankine-cycle principles in parallel within one system.

The parallel combination of the Brayton and the Rankine cycles of the present invention enables the Brayton part of the working fluid to operate at much higher pressure ratios and to serve the purpose of combustion and heat transfer directly to a second working fluid, so that the second working fluid operates at a much higher temperature than was possible previously in the serial combined-cycle engines. This invention eliminates the boiler, enables the use of a smaller compressor, combines the gas turbine and steam turbine into one turbine, recuperates the exhaust energy with liquid only and can operate at very high cycle efficiencies with high power output in a relatively simple heat engine.

With the heat engine of the present invention there will be a much higher mass flow through the expander sections of the engine than the compressor, which, as pointed out previously, is not the case with the gas turbine engine. In fact, because of the differences in mass flow resulting in different design parameters for the compressor and expander, the present engine cannot operate practically without the addition of a second working fluid. In other words, the practical embodiment of the invention cannot operate in a Brayton thermodynamic cycle alone, nor can it be considered a modified, water-injected version of a basic Brayton cycle engine.

As will be explained in greater detail subsequently, the heat engine of the present invention provides other significant advantages over other heat engines. These will be set forth as the heat engine of the present invention is described in greater detail.

DESCRIPTION OF THE PREFERRED EMBODIMENT

Figure 1:
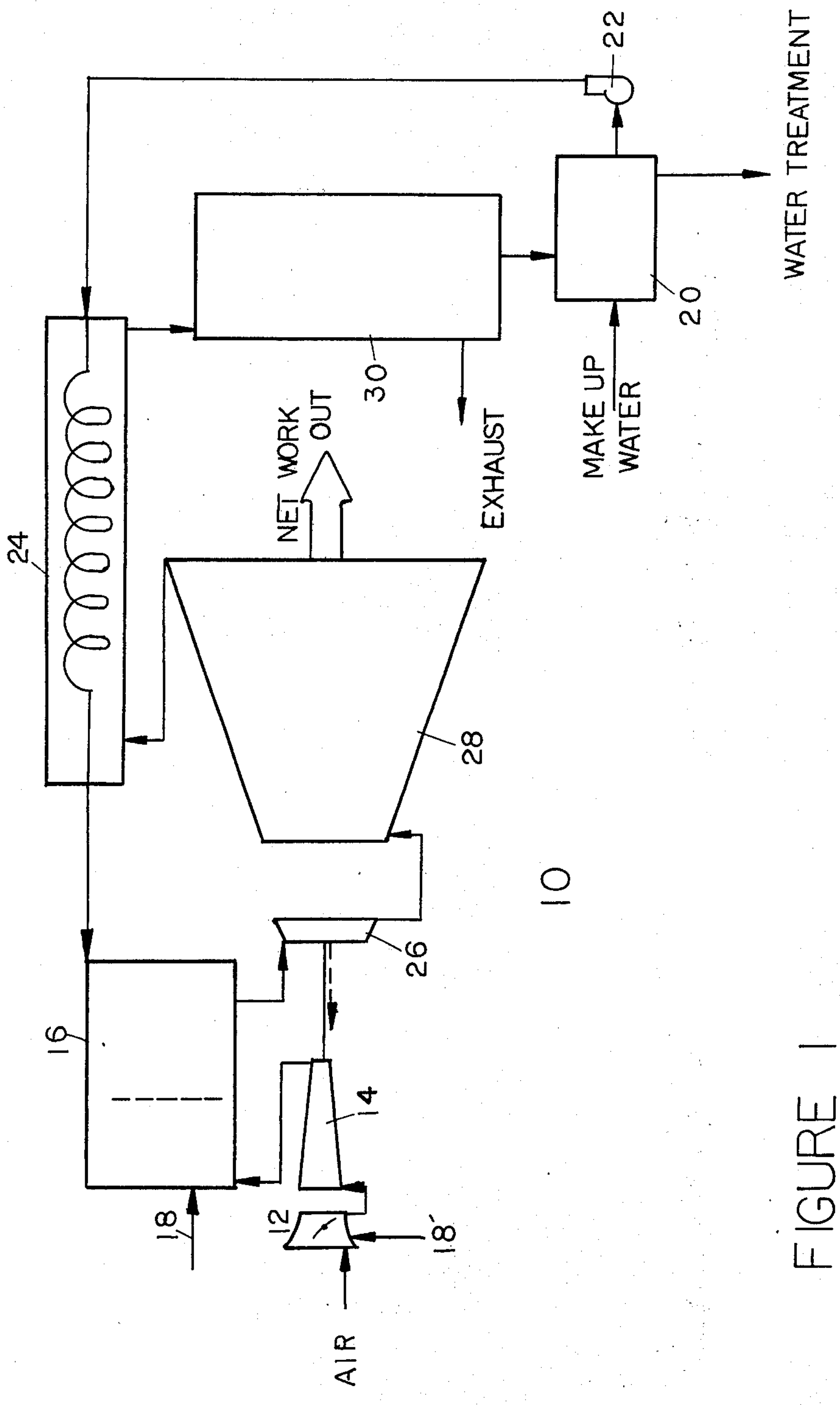
FIG. 1 is a block diagram of one embodiment of a heat engine incorporating the principles of the present invention.

FIG. 1 is a block diagram of one embodiment of a heat engine 10 in accordance with the present invention. It uses air as the first working fluid, fuel combustion with this air as the source of energy, and water as the second working fluid. Air enters a throttle 12 to regulate the air pressure prior to entering a compressor 14 where it is adiabatically compressed. If the compression ratio of the compressor is below 12:1, the throttle 12 can also serve as a carburetor with some of the fuel being introduced into the throttle as indicated by 18'. If the compression ratio of compressor 14 is greater than 12:1 without special cooling, spontaneous combustion would result within the compressor if an air/fuel mixture were compressed. For higher compression ratios, the fuel must be introduced after compression at 18.

From the compressor 14, the air or air/fuel mixture enters the combustion chamber 16. Where fuel has not been introduced into the air flow through the compressor 14 or where additional fuel is desired, it is introduced directly into the combustion chamber at 18. Through combustion, heat is added to the air; the combustion products thus heated constitute the first working fluid of heat engine 10.

Water or water/steam, the second working fluid, is compressed to a high pressure by pump 22. The high pressure water enters heat regenerator 24 where waste exhaust heat is absorbed from the steam/combustion product mixture exhausted from the expander 28. As will be described in greater detail subsequently, the absorption of heat by the high-pressure water in regenerator 24 occurs mainly below or at its boiling point. Because of the latent heat of evaporation of water, much of the heat absorbed by any water converted to steam is absorbed at essentially constant temperature, i.e. boiling temperature.

The heated water or steam/water mixture from the regenerator 24 then enters the combustion chamber 16. To help cool the combustion chamber walls, the heated water can first pass through water jackets in the wall of the combustion chamber. Any water introduced into or just after the combustion chamber is rapidly evaporated into steam. Transfer of thermal energy from the heated combustion products to the steam is accomplished through turbulent mixing of the two working fluids. The water vapor is mixed with the combustion products only after combustion is completed so that the water does not squelch the combustion process. The water, however, is used to control the temperature of the combustion products, as will be described in greater detail subsequently.

The mixture of the two working fluids then enters an expander or core turbine 26, which drives the compressor 14, then enters another expander or work turbine 28. These expanders convert the thermal energy of the two working fluids into mechanical work, to drive the compressor 14 and to produce net work output.

From the expander 28, the working fluid mixture passes through the regenerator 24, where heat is given off to the water entering the combustion chamber, as previously explained.

The steam-air product can be discharged in an open-cycle mode. Alternately, the steam-air product mixture is discharged into a condenser-separator 30, where the steam component of the mixture is condensed back into water and sent to a water reservoir 20, as shown in FIG. 1. In this manner, water, one of the two working fluids, is separated from the gaseous working fluid, with the water being recovered and the gaseous combustion products exhausted.

The two working fluids, water and air products, thus follow parallel cycles with the two fluids being mixed prior to the expansion part of the cycle. Since the two fluids are mixed, the output of each is added together, i.e. compounded.

To better illustrate this dual fluid, parallel-compound principle, reference is made to the thermodynamic heat cycles of FIGS. 2A and 2B illustrating for each of the two working fluids the pressure-volume (P-V) and temperature-entropy (T-S) diagrams, which, as will be shown, are coupled in parallel during certain parts of the cycles.

Figure 2:
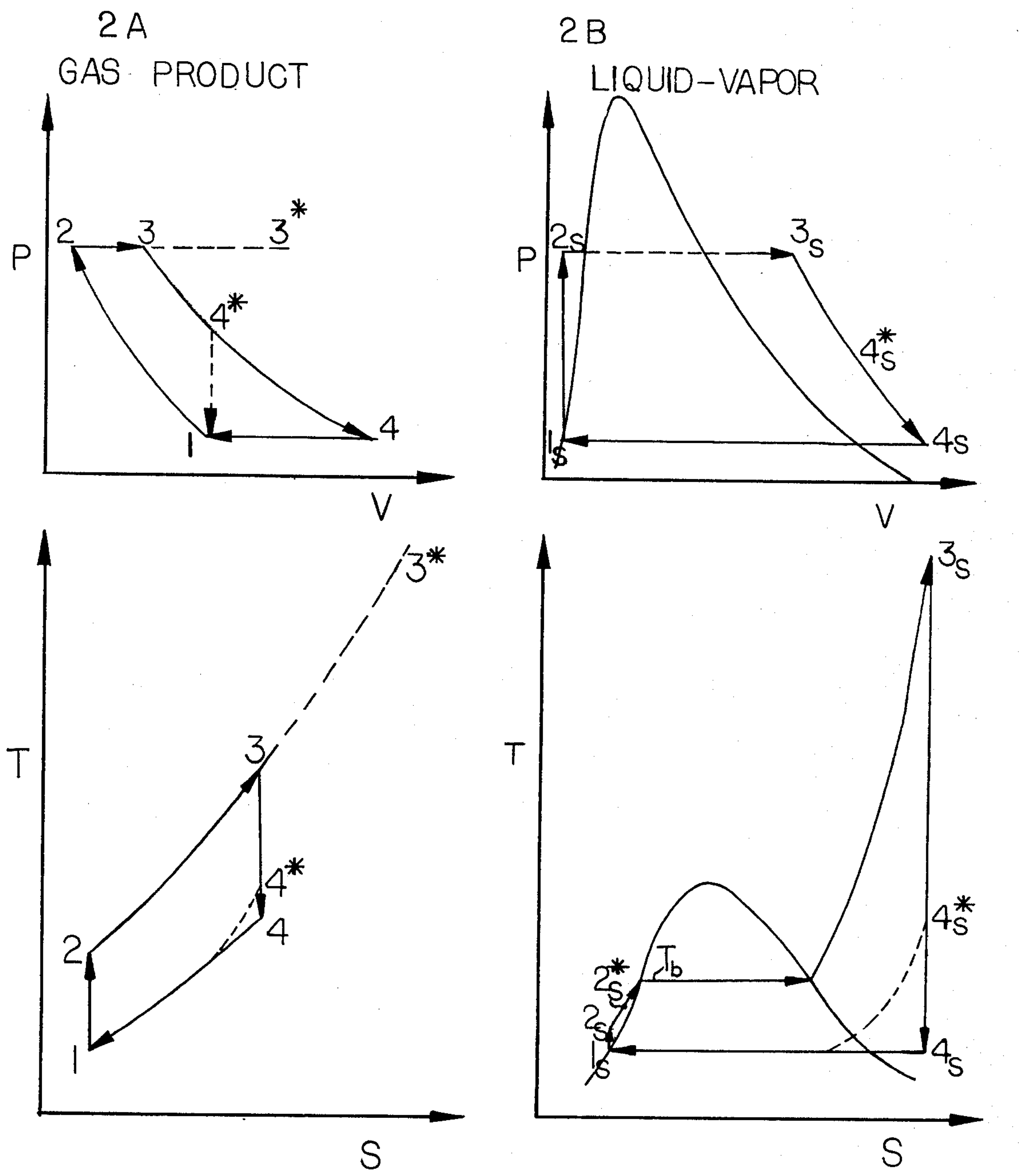
FIGS. 2A and 2B illustrate the pressure/volume and temperature/entropy diagrams of each of the two working fluids in accordance with the thermodynamic cycle of the present invention.

In the diagrams for the air products, FIG. 2, air is compressed from 1 to 2, heated by combustion from 2 to 3. The air products theoretically can reach 3, 5500°~6000°F by stoichiometric combustion, but are controlled to reach 3, with the rest of the essentially stoichiometric combustion energy being transferred to steam. Referring to FIG. 2B, water is compressed from $1_s$ to $2_s$ and receives energy from air combustion to evaporate to steam and to super heat from $2_s$ to $3_s$.

In FIGS. 2A and 2B, the following pressures and temperatures of the two working fluids coincide: $P_1 = P_1$; $P_3 = P_{3_s}$; and $T_3 = T_{3_s}$. The dual fluid will expand from 3 to 4* if piston expanders 26 and 28 are used or to 4 if ideal turbines are used. $T_{4^*} = T_{4s^*}$; $T_4 = T_{4s}$; $P_4 = P_{4_s}$. This completes the air cycle.

If the closed cycle is used for steam, then the steam condenses from $4_s$ to $1_s$ completing its closed cycle. If the open cycle is used for steam then the exhaust steam also completes its expansion at $4_s$, or at $4_s$ with heat regeneration. Since $T_{4_s^*} > T_{2_s}$, this allows the heat to be transferred to the compressed water which rises in temperature to $T_{2_s^*}$. If the exhaust temperature $T_{4_s^*}$ is higher than boiling temperature, $T_b$, then the water can be heated to boiling temperature and partially evaporated.

If the air inlet temperature is, for example, 80°F and the compression ratio is limited to approximately 12:1, the carburetor 12 can supply the right fuel air mixture ratio with a throttle, which generally is not done with a gas turbine. If a liquid fuel such as methanol, gasoline or JP-4, etc. is used, a large portion of the fuel can be injected in the liquid phase at throttle 12 or between compressor stages. The fuel evaporation tends to keep the air-fuel mixture at constant-temperature during compression. This is important in that, as will be shown, the engine 10 produces its best efficiencies at a high compression ratio, and cooling of the compressed gases is significant in the latter compressor stages.

As a result, the work of compression for an air inlet temperature of 80°F is reduced and the engine efficiency is increased. In contrast, in a gas turbine, adiabatic compression of the incoming air occurs and more work is required to compress the air. Although fuel metering is very much simplified by using a carburetor at 12, as explained previously, self-ignition may occur if the compression ratio is very much over 12:1. In this case, 12 would be used to control air flow rate only.

ADVANTAGES OF THE HEAT ENGINE OF THE PRESENT INVENTION

The dual fluid, parallel compound cycle of the present invention constitutes a self-contained engine operating in an entirely new thermodynamic cycle with improved practical thermal efficiency and mechanical structure simplicity. Its features and attributes include:

1. Unlike a gas turbine engine, fuel can be burned at or near stoichiometry. In a constant pressure process such as a Brayton cycle (gas turbine), most of the constant pressure processes utilize large amounts of excess air to keep the working temperature within tolerance. By excess air, it is meant that more air is supplied than required for complete or stoichiometric combustion. As a result, the horsepower required to pump the excess air, typically 400% of the stoichiometric requirement, is not only high for high pressure ratio engines but also is reflected in the machinery size and high hardware cost of the engine itself.

2. In spite of nearly stoichiometric combustion, turbine inlet temperature can be kept as low as necessary because of materials' limitations, or generation of $NO_x$ pollutants, by the introduction of water. High work content of the dual-fluid engine is retained in spite of these low temperatures because the specific heat of steam at constant pressure is at least twice as high as that for the air-fuel combustion product. In other words, steam is used, and used much more effectively, as the principal working fluid, rather than air, as in a typical gas turbine.

3. This engine trades off compressor work and latent heat of evaporation between two working fluids to reach high pressure, high temperature and high enthalpy turbine inlet conditions with minimum total work and heat expenditure. The pump work to compress water is negligible, especially compared with the work to compress air in a gas turbine. The trade-off is with the latent heat of evaporation. In other words, although not much work is required to compress water, a good deal of energy is required to change water to steam. However, the latent heat of evaporation becomes smaller when the pressure is increased. For instance, it becomes zero at 3206 psia, although the work done in pumping the water is then not negligible. Super-heating the steam to a very high temperature, as compared to typical steam engine temperatures, also makes the latent heat a small portion of the total energy content of the steam. Either way, the dual fluid approach of the present invention enables the cycle to operate along a practical low-energy path to reach high-pressure, high-energy states ready to expand through a mechanical expander.

4. The high Btu content of the water enables the power density (hp/lb throughput of the working fluid) to be high. The amount of working fluid to be handled per horsepower is low and greater machine as well as fuel economy results.

5. This engine allows unequal mass flow between the input compressor and output expander with two working fluids working in parallel so that high pressure is always used across the coreturbine 26, independent of load, to assure the best mechanical efficiency operation mode of the turbine.

6. Water-steam can be used as a coolant to cool high temperature engine components. Water is much more effective as a coolant than air. Very high temperature turbine blades have to be cooled. Film cooling by water is far more effective than cooling with air. More importantly, film cooling using the high latent heat of evaporation of water can be used to limit the temperatures in the expander machinery even when exceedingly high turbine-inlet operating temperatures (2500°F) are used without necessitating the use of critical materials. Such technology has been well demonstrated in cooling rocket combustion chambers where much higher internal gas temperatures are generated.

7. Water is the main working fluid with air combustion products used primarily as a means to transfer chemical energy from the fuel by means of combustion. This heat is transferred directly to the steam by means of turbulent mixing. This increases the heat transfer coefficient by a factor over 10,000 greater than the conventional heat transfer methods through boiler tubes.

8. Steam does more mechanical work for the same pressure ratio than does the air-fuel combustion product.

9. Water in a channel has a much higher heat transfer coefficient than gas. Thus, water is better to use in a heat recuperator unit than is air.

10. In the closed-cycle mode, condensation from the exhaust gases are used as a means of transferring heat to regenerate the working fluid, water. The water temperature tends to reach its boiling temperature and remain at that temperature within the regenerator 24 while still absorbing energy, resulting in a higher temperature difference between exhaust temperature and regenerator temperature and thus a higher heat transfer rate. On the heat source side, after the gas mixture leaves the expander 28, the steam cools and condenses and the temperature does not drop any more after it reaches the boiling temperature of water. This again maintains the temperature differences of two fluids passages, thus the heat transfer rate.

11. This regeneration system is unique in that heat regeneration cannot be done well with a Rankine cycle engine alone, and the heat regeneration in the high pressure ratio Brayton engine cycle alone cannot be done very economically. Nor can such efficient regeneration occur in combined (series) cycle systems either. In other words, high efficiency operating conditions are possible, which thus far are not available in Brayton or Rankine cycle engines operating alone or in series.

This system enables the recovery of waste exhaust heat by one of the working fluids, the liquid, while under high pressure. This engine operates under a minimum energy input path to bring the two working fluids to high pressure and high temperature conditions by the choice, on the one hand, of the optimum compressor work operating on one working fluid and, on the other hand, of the latent heat of evaporation of another working fluid. This choice enables the partial load operating efficiency to be approximately the same as the practical thermal efficiency of the same engine operating at peak load.

12. Condensed steam may be utilized in a scrubbing process to remove pollutants, especially $SO_2$. This, however, would require water treatment to limit the concentration of $SO_2$.

13. The air-fuel combustion products, if burnt stoichiometrically, contain 8% water vapor even before water injection. This can be used as makeup water in the condenser. This allows the condenser to be operated at a higher temperature, thus saving both the energy in the cycle and materials in the form of a smaller size condenser.

APPLICATIONS

The actual design parameters of a heat engine in accordance with the present invention will depend upon the use and application of the engine. For example, potential engine designs can be categorized from very large stationary engines to small transportable engines:

1. 100~800 megawatt power plants.
2. Large aircraft fanjets.
3. Locomotive, ship, portable power plants, etc.
4. Earth moving equipment, trucks (150~1,000 hp), mining equipment, etc.
5. Automobiles (40~150 hp).

6. Motorcycles, outboard motors for boats, lawnmovers (5~40 hp).

7. Miniature jets, sail planes, hang-gliders, model airplanes, remote pilot vehicles, target practice airplanes, windtunnel model for simulations, model airplane builders, etc.

Among these categories the major differences are load factors and equipment efficiency. For instance, stationary power plants and engines for large vehicles and ships can go up to a pressure ratio of 200:l, and upper temperature limits of 2500°~3000°F. The partial load efficiency is required to be high. Locomotives and ships have a fairly constant load but the throttle response is required to be good. Earth moving equipment, trucks, etc. have to be extremely responsive to load. An automobile engine requires little or no acceleration lag and should also be able to use the engine for braking. When the engine sizes become small, rotary compressors become very poor in efficiency; piston or positive displacement compressors are more efficient.

From the cost standpoint, the high temperature operation requires super alloys which are very expensive. High pressure ratios mean a bulky construction for the engine. It adds both cost and weight. But these are the requirements for higher thermal efficiency.

One can determine engine cycle parameters for a particular engine application using a heat engine of the present invention. $T_4$ is determined by materials and cooling methods and this temperature also influences the choice of cycle pressure ratios. The basic cycle is based on constant pressure, continuous combustion.

ILLUSTRATIVE EXAMPLES — CALCULATIONS OF ENGINE CYCLE PERFORMANCE

In order to demonstrate the applicability of the dual fluid, parallel compound cycle of the present invention in different applications, examples of engines designed for use in trucks and in large power stations will not be discussed.

Design and operating parameters will be given. It should be understood that these specific examples are illustrative only, and the engine of the present invention should not be construed to be limited to any particular configuration or application. Also, the information which follows should be understood to represent typical or expected data. In practice, design and operating parameters for any given engine can be expected to vary from those provided in the following paragraphs.

EXAMPLE 1: TRUCK ENGINE

Desired Attributes:

1. Comparatively low cost
2. Low weight
3. Low pollution
4. Responsive to load, little acceleration lag
5. Quick starting and shutdown
6. Good fuel economy, i.e. high cycle efficiency

OPERATING AND DESIGN PARAMETERS FOR STEADY STATE OPERATION BASED UPON A 1 LB/SEC AIR FLOW BASE:

The mechanical efficiencies of components are assumed to be: compressor, 80%; combustion mixing chamber, 2.5% pressure drop; turbine 90%; lower heating value of the fuel 18,600 Btu/lb; and a pressure ratio of 12:1.

1. Input to throttle 12: Assume that the incoming air is at ambient pressure, 14.7 psia, ambient temperature 60°F., and air flow rate of 1 lb/sec.

2. Output of throttle 12: Assume an air-fuel (A/F) mixture of 15:1, a little on the lean side of the stoichiometric air-fuel ratio. Assume a fuel-air mixture at a temperature of approximately 80°F and at a pressure of 14.7 psia, or lower, depending on throttle position as it enters compressor 14. Ignore temperature effects of throttling and fuel vaporization.

3. Output of compressor 14: Assume compression ratio of 12, pressure at 176.4 psia and temperature at 713°F.

4. Output from combustion chamber 16: The dual fluid mixture is at a temperature of 1800°F and a pressure of 172 psia, having received energy from compression and contribution of air-fuel mixture. The mixture has a mole fraction X, number of constituent molecules/total number of molecules, of approximately: $X_{air} = 0.502$, $X_{steam} = 0.498$.

5. Work output of expanders 26 and 28: The dual working fluid expanded in core turbine 26 consumes aproximately 211 hp to power air compressor 14 and accessories and is continuously expanded through the work turbine 28 down to a pressure of 15 psia, at a temperature of approximately 946°F to produce 676 hp useful work. This engine has an overall thermal efficiency of 40%.

6. Regenerator 24: The steam/air mixture enters heat regenerator 24 where it gives up 425 Btu/lb of air/sec to heat the injected water or water freezing-point depressant mixture. Under the assumed operating conditions, ideally, the dual-fluid mixture reaches ambient pressure (15 psia) at a temperature of 159°F. To achieve this temperature, it requires that regenerator 24 have a heat exchange surface of approximately 160 $ft^2$ surface area per lb of air/sec.

7. Input to condenser/gas separator 30: The mixture enters condenser/gas separator 30. Heat is rejected to the ambient air. This requires approximately 1000 $ft^2$ area per lb of air/sec with a conventional heat exchanger.

The combustion products are exhausted after the steam condenses. One of the combustion products of hydrocarbon fuel is water. As a result, not all cycle water need be recovered. In other words, a "no water-addition" state of equilibrium is achieved so long as lost water is no greater than that supplied by combustion. This also means that the condenser size is smaller than would otherwise be required.

8. Output from condenser 30: Condensed water is treated to remove dissolved contaminants and pumped to 180 psia by water pump 22 into the regenerator 24 at a maximum rate of approximately 0.67 lb/sec.

Treatment and elimination of pollutants resulting from combustion, which are dissolved in the water, eliminates the need for extra air pollution abatement devices. Thus, for example, fuel containing sulfur can be used without polluting.

The sulfur content in fuel is burned as sulfur dioxide, $SO_2$, which is readily dissolved in water to form a weak acid, $H_2SO_3$. $H_2SO_3$ can be removed by water treatment chemicals.

Because of the stoichiometric (somewhat lean) combustion, CO and unburned hydrocarbons are minimized. Also, the introduction of water into the combustion chamber is used to reduce combustion temperatures enough to minimize $NO_X$ production.

Figure 3:
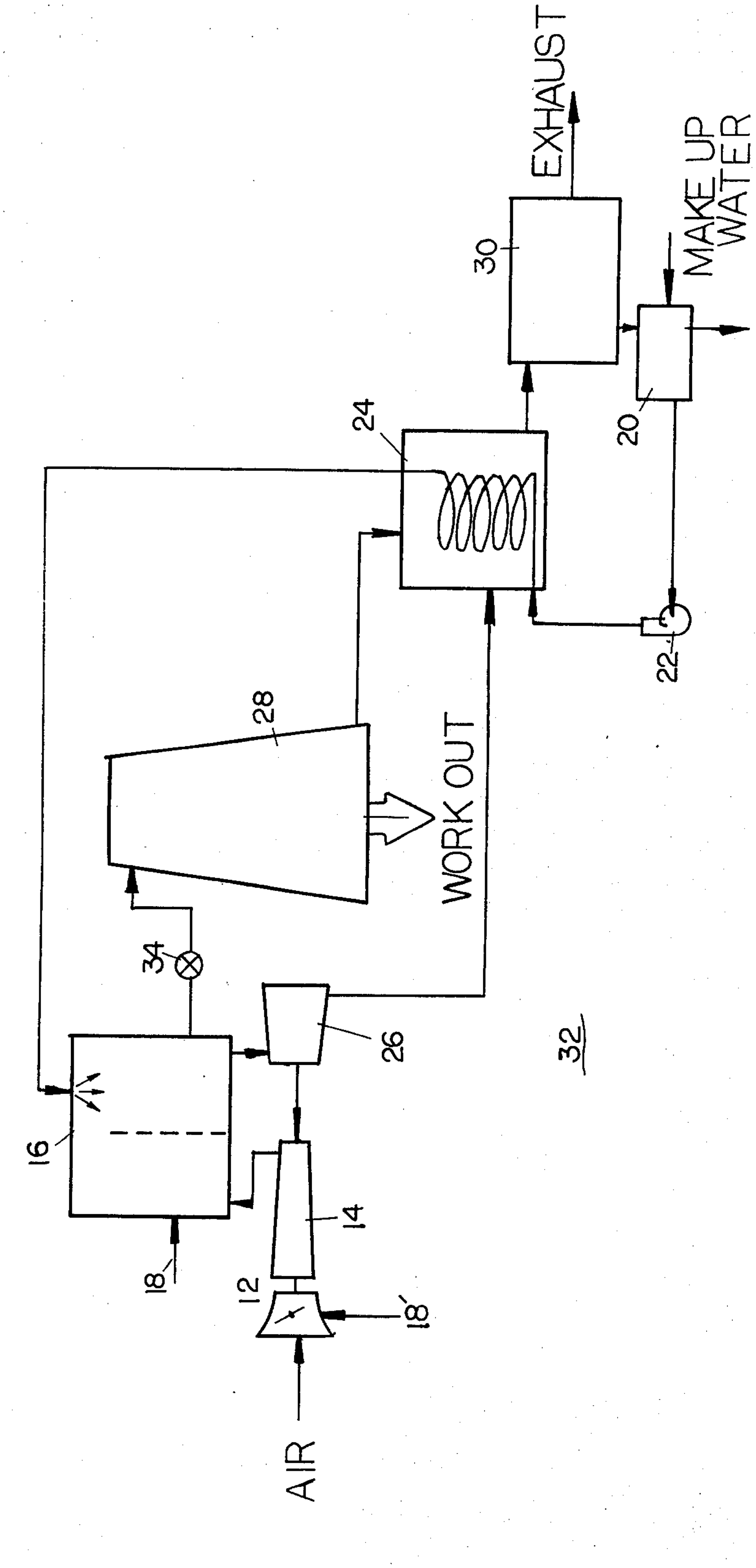
FIG. 3 is another embodiment of a heat engine utilizing the principles of the present invention.

Another embodiment 32 suitable for a truck engine is shown in FIG. 3. The mass flow rate, temperature and pressures are approximately the same as the previous example except the dual-fluid working fluid is divided into two paths at the output of the combustion chamber 16 by means of a throttling valve 34. One path leads directly to the output expander 28, while the other goes through the core expander 26, as in the embodiment of FIG. 1.

With this arrangement, the core turbine 26 has a high pressure ratio across it, without direct back-pressure feedback as the series-flow path of the embodiment of FIG. 1. With the parallel path arrangement of engine 32 under heavy load or torque, the work turbine 28 can run at a very slow speed, without stalling the compressor-drive expander (turbine) 26. This also enables the engine to maintain optimum operating conditions under partial load when working turbine 28 is throttled down.

EXAMPLE 2: CENTRAL POWER PLANT

Requirements:

1. High overall thermal efficiency
2. Low maintenance cost
3. Responsive to load
4. Little or no change of thermal efficiency under partial load condition
5. Relatively short starting and shutdown time lag The basic cycle is diagrammed also in FIG. 1. The unit can be of any size; the normal size range is from perhaps 200 hp to 1,300,000 hp. Without the self propelling requirement, one can be generous in the regenerator and the condenser sizes to lower the compressor-drive turbine hardware costs. It is assumed that the first few stages of the compressor-drive turbine can use water/steam transpiration cooling, so the turbine inlet temperature can be raised to 2200°F. The parameters chosen for an optimum design are:

1. A compression ratio of 20:1
2. Fuel-air ratios - 100% theoretical air, i.e. stoichiometric, with lower heating value of 18,600 Btu/lb
3. Turbine inlet temperature 2200°F
4. Partial load can be adjusted by changing air/fuel ratio and steam/air ratio.

All calculations are based on unit air flow rate at one lb/sec. The operating thermal efficiency assumes compressor efficiency of 80% and turbine efficiency of 90%. These efficiency assumptions allow the accessory horsepower requirements to be neglected.

1. Input to throttle 12: Assume the incoming air is at a rate of 0.0347 mole/sec (1 lb/sec air flow of approximately 14 cu. ft.) at ambient pressure of 14.7 psia, and ambient temperature of 60°F.

2. Output of throttle 12: Pressure at 14.7 psia; temperature at 80°F, or less due to throttling.

3. Output of compressor 14: Air temperature at 870°F and presssure at 294 psia. Compressor 12 requires approximately 297 hp/lb of air/sec.

4. Fuel into combustion chamber 16 at 1/15 lb/sec.

5. Combustion chamber 16: Total heat input rate approximately 1227 Btu/sec. Water injected into chamber 16 at a rate of 0.56 lb/sec or 0.0325 mole/sec at 460°F. Thus, $$\text{Mole ratio} = \frac{0.0325}{0.0347} \approx 0.937 \ \frac{\text{mole of water}}{\text{mole of air}}$$

and the molar fraction for each fluid is: $X_{H_2O} \approx 0.484$, $X_{air} \approx 0.516$.

The total working fluid = 0.0672 mole/sec = 1.56 lb/sec at a pressure of 288 psia (assuming 6 psia pressure loss in combustor) and at an outlet temperature of 2200°F.

6. Expander 28: Net work out = $hp_{out} - hp_{compressor}$ = 891 hp/lb air/sec, thus this engine has an overall thermal efficiency of 51.3%. The exhaust conditions at the output of the expander 28 are temperature 1012°F and pressure 16.17 psia.

7. Regenerator 24: Energy recovery in regenerator 24 is approximately 546 Btu/lb air/sec. Exit conditions from the regenerator are temperature 150°F and pressure 15 psia. Assume that the regenerator 24 heat transfer coefficient is 25 Btu/hr/ft$^2$/°F. This requires a heat exchange surface area of approximately 100 ft$^2$/lb/sec of air flow, which is smaller than example 1, due to much larger temperature differences in this engine configuration.

8. Condenser 30: Condenser exhaust is at a pressure of 14.7 psia and a temperature of 80°F. Coolant water temperature is also 60°F. Total heat rejection rate is 597 Btu/sec. A stationary power plant can use a counter current barometric condenser, which has a condensation heat removal capacity of 100,000 lb steam/hr, by companies such as Ingersoll-Rand, Co.

If water is allowed to escape at 0.08 lb/sec at 110°F, the area can be cut down by 15%. Since water is generated by combustion of fuel at approximately this rate no water need be added to compensate for this loss. If the water escape rate is equal to 0.15 lb/sec (partially open cycle), the area can be cut down by 24%.

9. Hot well 20: Water is treated to remove contaminants and pumped by pump 22 to 300 psia at 80°F. Any makeup water required is added at this point.

The overall efficiency of the engine described in the foregoing example is approximately 50%. This is 3% better than a series compound cycle engine at the same turbine inlet temperature of 2200°F and a pressure ratio of 16:1, which is limited by the gas turbine part of the combined cycle. The power throughput of this system is 891 hp/lb air/sec compared with a serially combined cycle system of 214 hp/lb air/sec. This means the central power plant of the present invention is a factor of four smaller than the combined cycle system for the same work (horsepower or kilowatt) output.

FEATURES OF THIS NEW ENGINE

The heat engine of the present invention is unique as compared with existing heat engines in many ways. The engine is based upon an entirely new thermodynamic cycle using two interacting working fluids in parallel, one following a Rankine-type cycle and the other approximately a Brayton-type cycle. While both of these cycles are incorporated in the engine of the present invention, it is not merely a composite of these two cycles. The engine of the present invention is unique compared with Brayton and Rankine cycle engines in the following respects:

Unlike Rankine (liquid-vapor) Engine:

1. No boiler
2. Can use regenerator to recover exhaust turbine energy

3. Combustion product in direct contact with water/-steam and mixed turbulently to a homogeneous state; no external combustion.

4. Allows condensation of combustion created water vapor to provide makeup.

5. Dissolvable pollutants such as $SO_2$ are eliminated from the exhaust.

6. Can operate anywhere between closed and open cycle.

Unlike Brayton:

1. Most of the work output is done by a liquid-vapor, water-steam.

2. Water, a working fluid, is used as dilutent for controlling turbine inlet temperature, rather than air.

3. Combustion at maximum efficiency is at or near stoichiometrical air/fuel ratio.

4. The second working fluid, water-steam, is used as heat regenerating medium under high pressure ratio low exhaust temperature operation.

5. High water/air, molar or weight, ratio in the working fluid.

6. Low air flow throughput (high hp/lb/sec air).

7. Water can be recovered for reuse.

8. A combustible freezing point depressant, such as methanol, can be added to water to prevent freezing and the engine cycle operates at rich fuel/air condition.

9. The mass flow rate through the air compressor is much less than that through the expander. Only enough air passes through the compressor as is required for combustion.

Several of the performance and operating features which distinguish this cycle from other engine systems will now be examined in greater detail.

Figure 4:
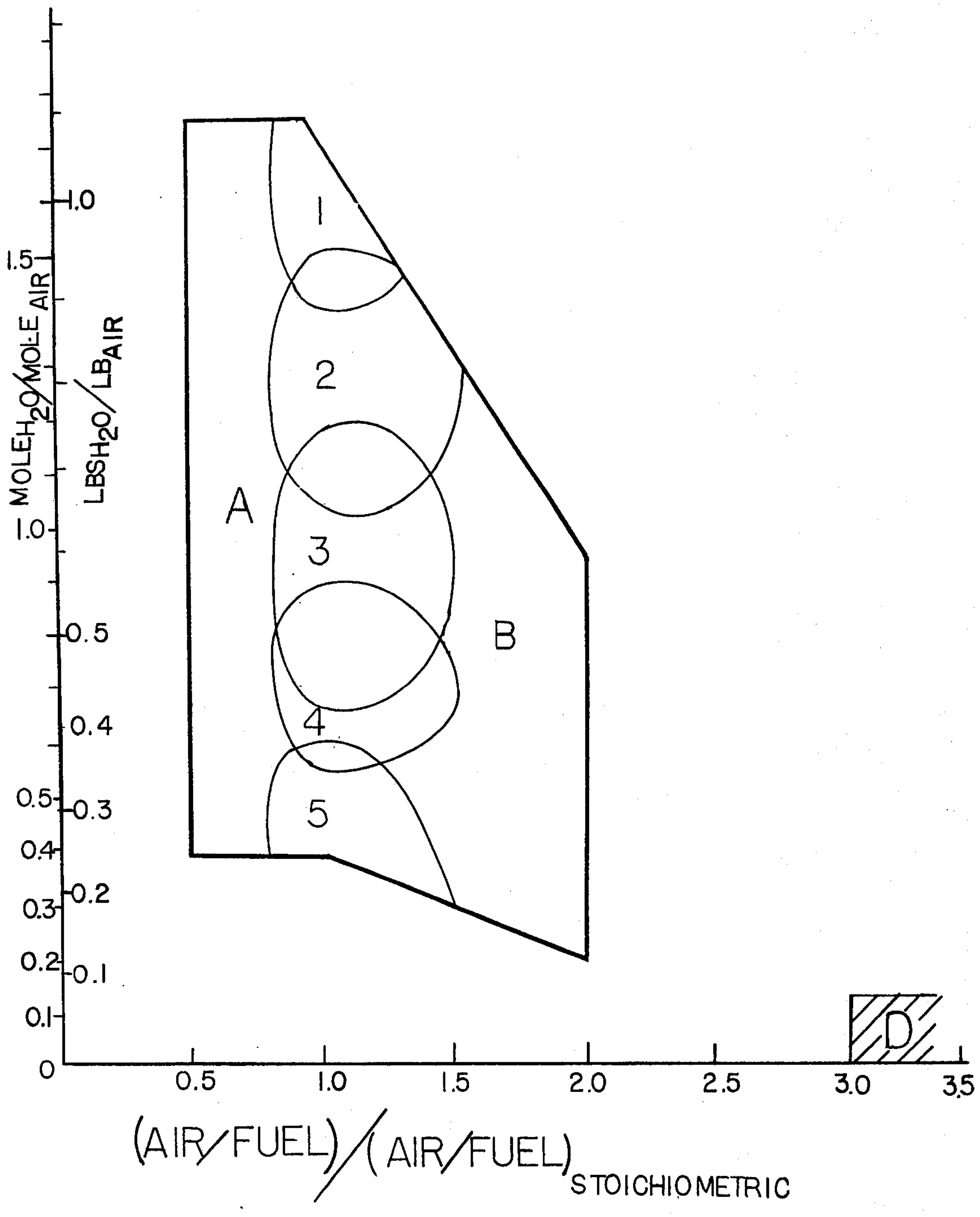
FIG. 4 is a graphical illustration of the operating regimes for the mass and molar ratios of two working fluids, air products and water, versus the ratio of air to fuel divided by the stoichiometric ratio, for heat engines utilizing the principles of the present invention.

As explained, one difference between the dual-fluid, parallel compound cycle of the present invention from the gas turbine cycle is that the combustion occurs near or at the stoichiometric fuel/air mixture ratio line. This is illustrated in FIG. 4, a graph plotting air/fuel weight (or molar ratio) versus water/air weight (or molar ratio). A completely stoichiometric air/fuel mixture occurs when the air/fuel ratio versus (air/fuel) stoichiometric ratio is 1:0. A gas turbine operates in the region of $(A/F)/(A/F)_{ST} = 4.0$.

An approximately stoichiometric mixture ratio of air/fuel mixture $(A/F)/(A/F)_{ST}$ is the preferred area of operation. In the case of hydrocarbon fuels, this covers a range of air/fuel to stoichiometric air/fuel ratios of about 0.8 to 1.5. In a typical gas turbine, the total mixture of air and fuel including unused air is far above stoichiometry, as explained, whereas in the present invention there is, at optimum efficiency, a nearly stoichiometric mixture.

The preferred operating region of the new engine for the purpose of illustration, can be divided into five regions, 1–5. These regions represent roughly the range of water/air weight (or molar) ratio for engines of several given classes.

The higher the water/air ratio, the greater the combustion cooling. Thus, less expensive engines with cheaper materials will operate with higher water/air ratios; more expensive engines with lower ratios. More specifically:

Region 1 — low cost engine
Region 2 — automobile class engines (50~300 hp)
Region 3 — truck class engine (300~1000 hp)
Region 4 — central power plant (800~1,300,000 hp)
Region 5 — high inlet temperature engine (experimental > 2500°F).

As explained previously, water injection has been used in existing aircraft gas turbines in short bursts to augment thrust at take-off by added mass flow. This type of operation is represented by the area D. The amount of water which can be injected into a gas turbine is limited to about 8% of the air flow to avoid compressor stall. This is because the difference between the mass flow between the compressor and the turbine of a gas turbine cycle cannot deviate very much from the design point, which is essentially one of equal mass flow through compressor and turbine. So the method of mass addition by injection does not alter the basic Brayton cycle of such engines and thus does not duplicate or simulate the features or performance of the heat engine which constitutes this invention.

Note that regardless of which of the regions 1–5 that the engine falls within, the water/air mole ratio, representing the ratio of number of molecules of $H_2O$ versus air, is much greater than that for a gas turbine with water injection.

Note also that even in Region 5, a significant amount of water is added to the mass flow through the expander, mass which doesn't go through the input compression. Thus, knowing that each pound of water can store approximately more than twice the energy of a pound of air, for the energy in the water to be equal to the energy of air, it can be seen from FIG. 4 that the water-/air mass ratio is 0.25. This means that the output turbine must have at least 125% greater mass flow capacity than would a gas compressor where only air serves as a working fluid. Where even more water is added to the mixture, as in regions 1 through 4, the disparity between the mass flows through the expander and through the compressor is even greater.

Depending on the method of heat regeneration, the engine built in accordance with the principles of the present invention can be operated in Region B; that is, less fuel can be burnt because of heat regeneration and under partial load conditions and the $(A/F)/(A/F)_{ST}$ can be extended to 2.0.

During winter operation, methanol and other water soluble fuel can be added to water to lower the freezing point of water. This can be compensated for by adjusting the primary fuel flow to less than the stoichiometric mixture with the methanol fuel used to maintain near-stoichiometric overall fuel-air ratios where air is used only to produce the heating medium.

The water/air molar ratio in a steam (Rankine cycle) engine approaches 100 or greater and is out of the range of this cycle's operating region.

Figure 5:
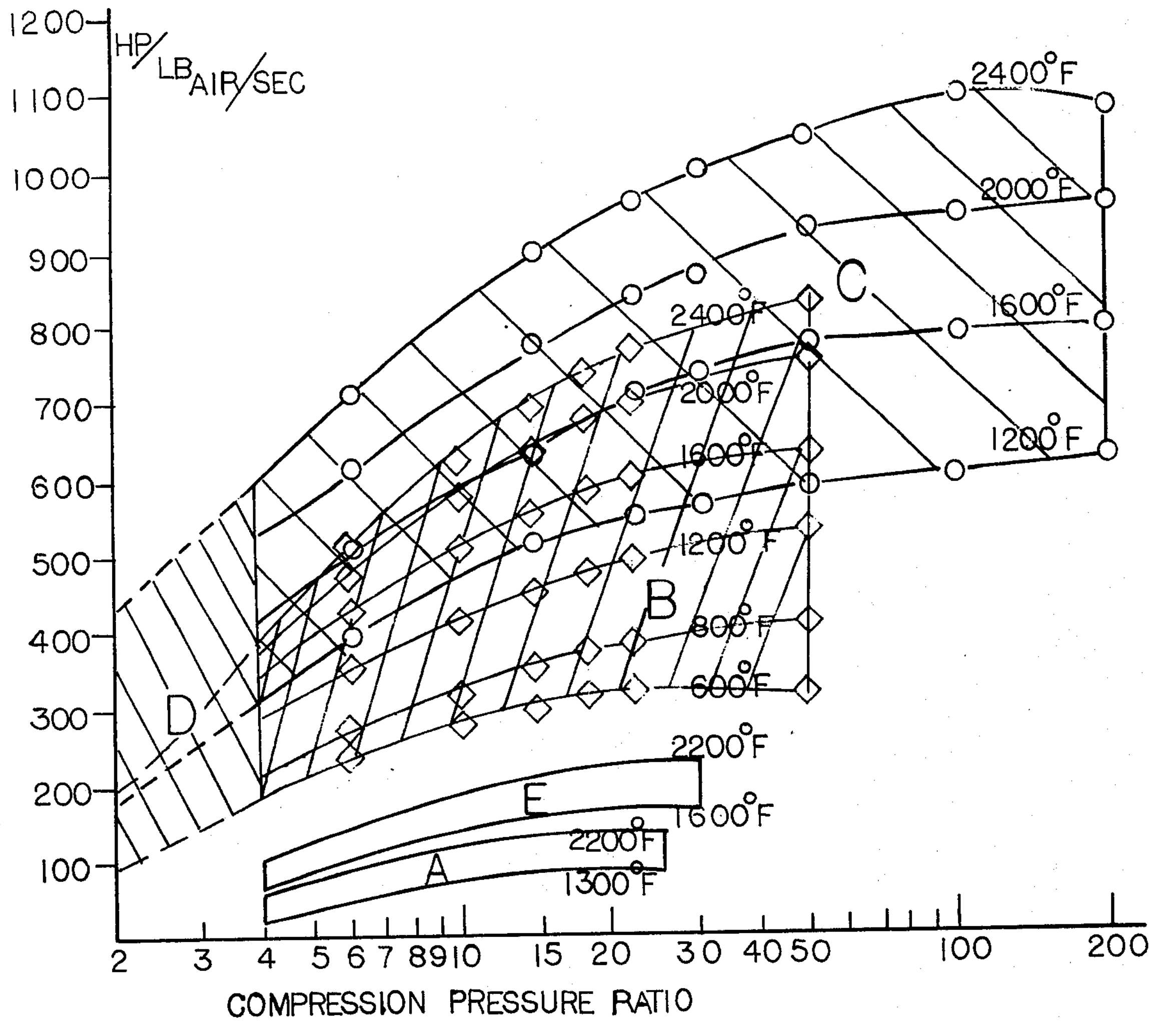
FIG. 5 is a graphical illustration of the engine pressure ratio versus hp/lb. air/sec. throughput for heat engines utilizing the principles of the present invention.

As shown in FIG. 5, another operating parameter which distinguishes this cycle from Rankine, Brayton, and serial compound cycles is in terms of hp/lb/sec of air flow. Because the Rankine cycle using steam as a working fluid uses virtually no air as the working fluid, no comparative figure in hp/lb/sec of air is provided in FIG. 5. The gas turbine, which ordinarily uses air as the working fluid, produces about 150 hp/lb/sec of air flow or less as indicated by Region A. Region E defines the operating area of a heat engine operating with a serially-compounded Rankine-Brayton heat engine.

In contrast, an engine according to the present invention utilizes air combustion products and steam to generate power. Its operating region when used in a non-regenerative cycle is designated Region B of FIG. 5 and is completely outside of Region A of the gas turbine and Region E of a serially combined cycle. As explained, for maximum efficiency the engine preferably is built to recuperate heat by heat exchange with the exhaust working fluid and by condensing some of the exhaust steam/water. With heat recuperation, the hp/lb of air/sec is even higher, falling in Region C of FIG. 5.

One can operate the cycle with the sacrifice of efficiency, for example, in engines designed for light-duty applications. This region is designated D, the region covering low compression ratios of 2 to 4, producing from 100 → 600 hp/lb/sec of air.

Figure 6:
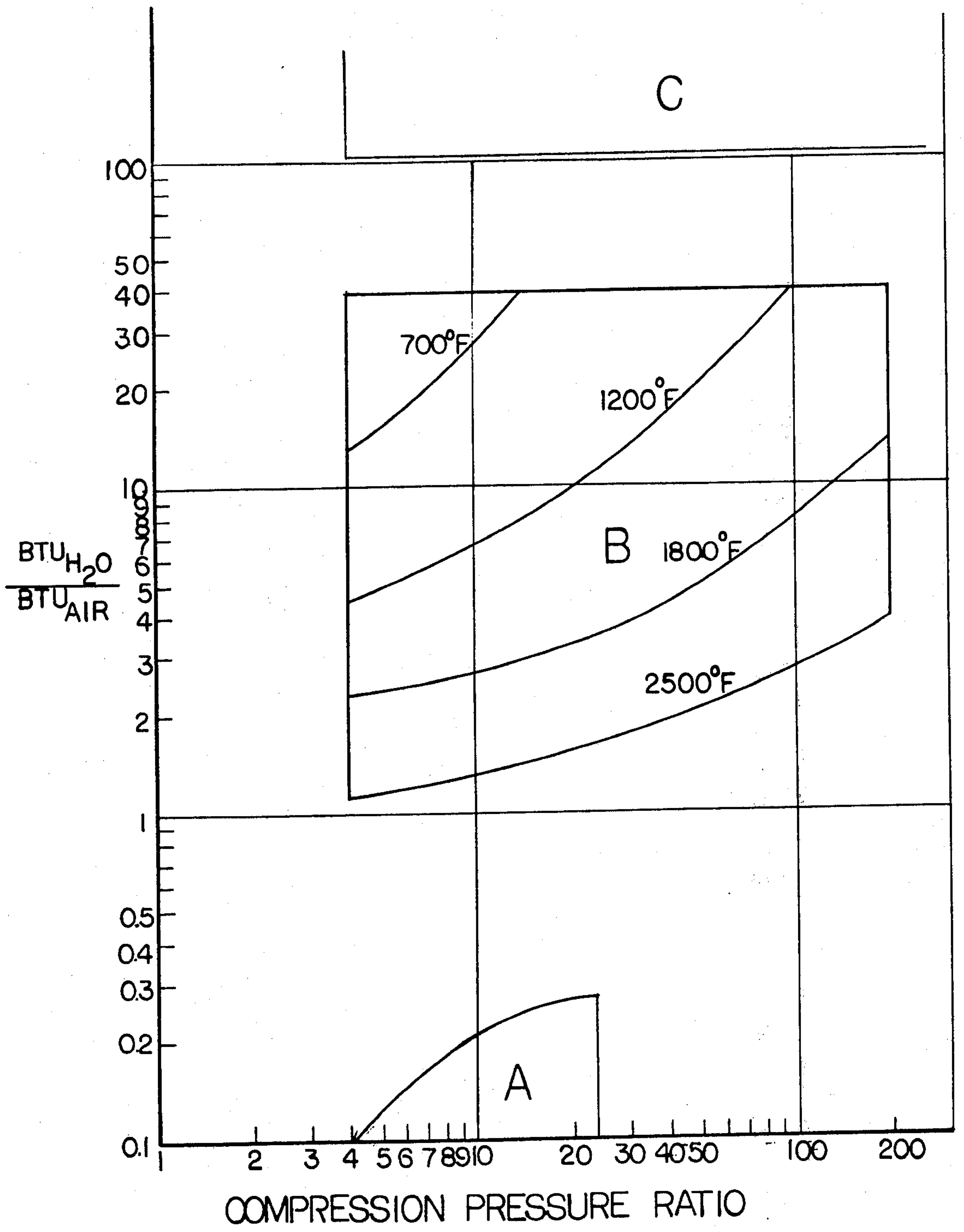
FIG. 6 is a graphical illustration of the ratio of energy distribution in the two working fluids, water and air, versus the pressure ratio for a heat engine utilizing the principles of the present invention.

Since the present invention is based upon a dual working fluid cycle, energy distribution between the fluids, normally water vapor and air combustion products, provides another distinguishing difference between the cycle of the present invention and the Rankine and Brayton cycles. As seen in FIG. 6, the energy content ratio, $Btu_{H_2O}/Btu_{air}$, is small for Brayton cycle engines with water injection, falling into Region A. The region of operation designated B, for engines in accordance with the invention, is separated from that of the present day gas turbine engines, Region A and from the Rankine cycle engine C. The serially combined cycle engine cannot be fairly represented in FIG. 6 because of its separated cycle nature. Of course, the energy content ratio is also equivalent to the work output ratio of the mixture. In other words, the work output of each of the two working fluids will bear approximately the same relationship as the energy content of the two working fluids.

The compression ratio for gas turbines is limited to 30:1 for present day engines, with or without water injection. In contrast, the engine of the present invention can operate at pressure ratios of 200:1 or higher. The heating of air by the work of such high compression and the heat caused by the combustion of fuel can be converted to hot steam, while the temperature of the turbine inlet is held to acceptable limits. This, again, is in contrast with the gas-turbine engine (Brayton cycle). The amount of heat that can be added by combustion is not limited because of high compressor-outlet temperatures. In other words, the dual-fluid, parallel-compound cycle of the present invention results in higher pressure ratio operation than in a Brayton cycle gas-turbine, and in higher temperature operation than in a Rankine cycle steam engine, resulting in higher thermal efficiencies than either cycle alone.

Figure 7:
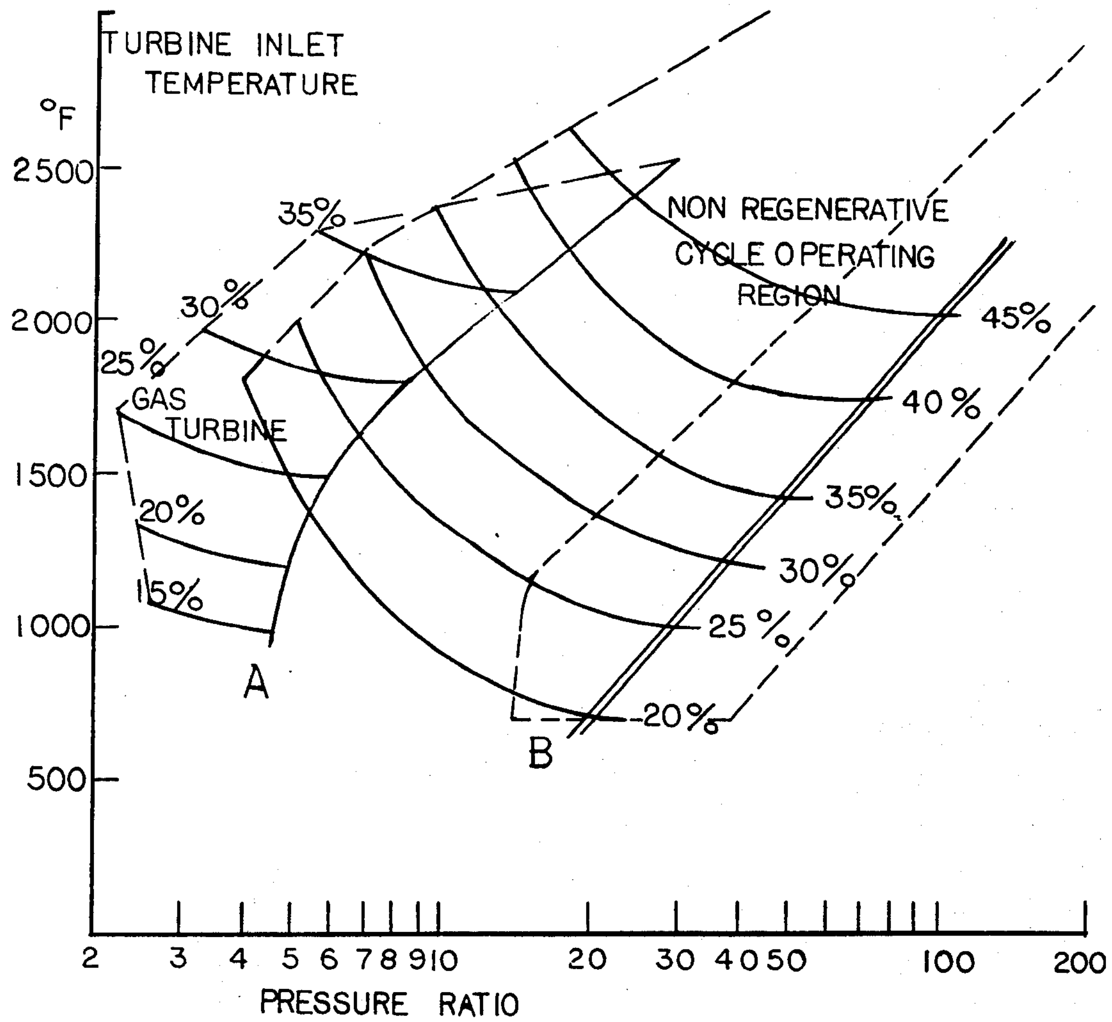
FIG. 7 is a graphical illustration of the turbine inlet temperature versus the engine pressure ratio with non-regenerative operation in a heat engine utilizing the principles of the present invention, with a cross-plot of overall theoretical efficiency.

FIG. 7 shows the operating region with compressor and turbine efficiencies of 80% and 90%, respectively, as a function of turbine inlet temperature and compressor pressure ratio for a non-regenerative cycle. By using water transpiration cooling the turbine inlet temperature can be extended further. Steam (Rankine) cycle engines are limited to 1,000°F due to boiler design pressure limits. It is not possible to operate gas turbine engines at lower temperatures. The preferred operating line for a gas-turbine is illustrated in the neighborhood of line A. Without heat regeneration, it has a preferred operating region in the neighborhood of line B.

Figure 8:
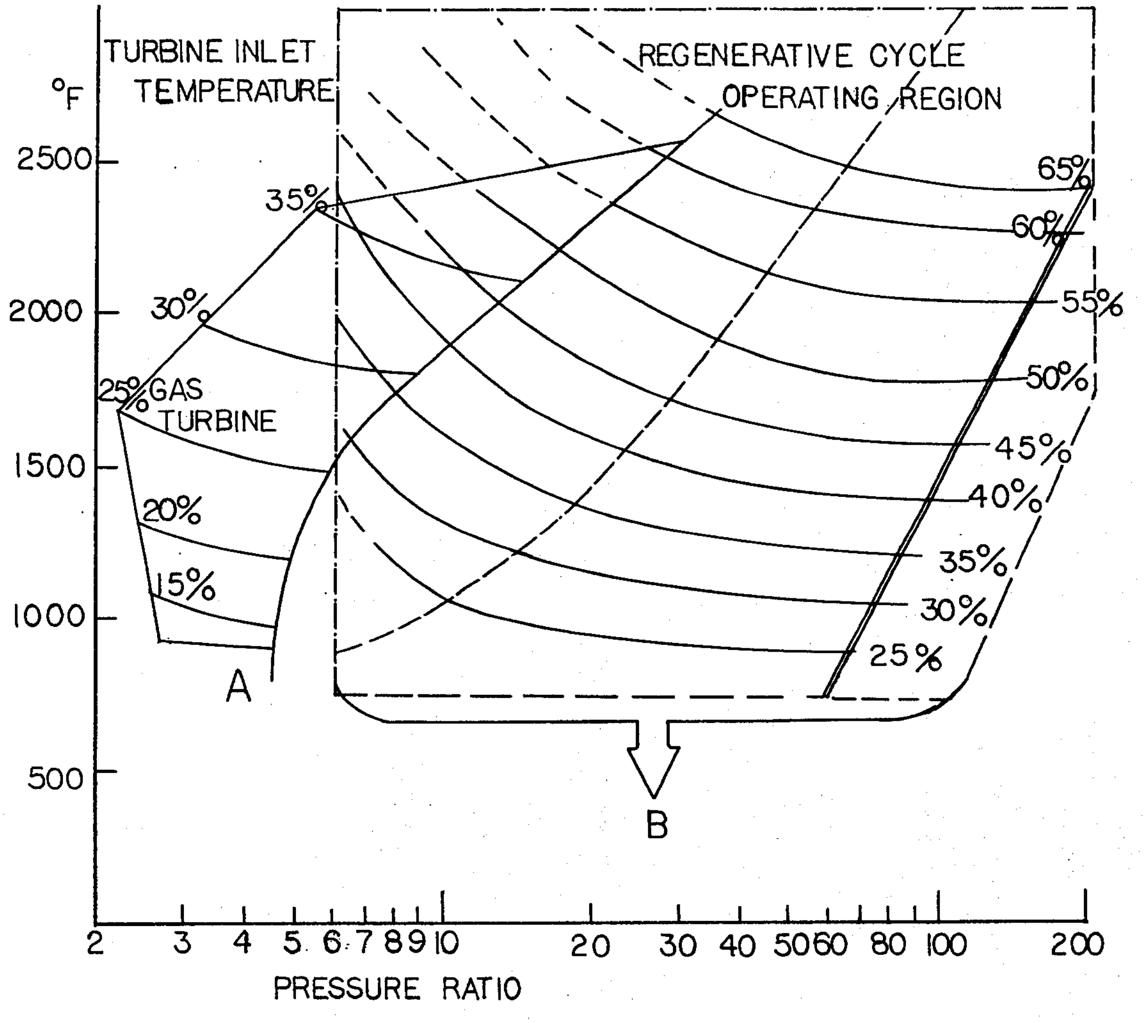
FIG. 8 is a graphical illustration of the turbine inlet temperature versus the engine pressure ratio with regenerative operation in a heat engine utilizing the principles of the present invention, again with a cross-plot of overall theoretical efficiency.

With regeneration, FIG. 8, the constant thermal efficiency curves with compressor and turbine efficiencies of 80% and 90%, respectively, tend to flatten with greater pressure ratios, a special feature of this engine. The most economical operating region is drawn along the flat efficiency curve, Region B, where under partial load condition the dropping of pressure ratio is allowed. This is also due to the fact that a heat recuperator designed for full load operation becomes much more efficient under partial load. The turbine inlet temperature can be kept constant by controlling the air/fuel ratio and the steam/air ratio and thus only a very small drop in cycle thermal efficiency results under partial load. The trade-off of overall efficiency versus engine costs and/or weight will finally determine the design point by the user for particular applications.

In the embodiment described, water/steam is introduced only within or just after the combustion chamber. However, if desired, water or steam can be introduced at other points within the engine cycle, such as between the compressor or expander stages.

As explained previously, fuel can be added directly into this combustion chamber or through premixing. In this mode during compression, the fuel evaporates continuously so that a constant-temperature compression path tends to be followed rather than an adiabatical compression process, thus saving in compression work.

It is also to be noted that in this engine no oil or lubricant need be in contact with the working fluid. This cycle retains the quick startup and shutdown features of a gas turbine system, and the high power density feature of a steam expander.

What is claimed is:

1. A heat engine comprising:

a. first means for converting heat energy to mechanical work essentially according to the Brayton thermodynamic cycle, having a first working fluid resulting from combustion of a mixture of air and a hydrocarbon fuel in the ratio of from about 0.8 to 2.0 times the stoichiometric air/fuel ratio;

b. second means for converting heat energy to mechanical work essentially according to the Rankine thermodynamic cycle, having a second working fluid comprising water;

c. said first and second means operating in parallel with each other with means for intermixing said first and second working fluids with a ratio of water-to-air by weight in the range of about 0.2 to 1.0 so that the work output of each is compounded and said second working fluid contains greater heat content than said first working fluid, and d. means for recuperating exhaust heat from said intermixed working fluid for pre-heating said second working fluid to the vapor or mixed liquid and vapor form prior to intermixing with the first working fluid.

2. A heat engine comprising:

a. a combustion chamber;

b. compressor means for introducing a first reactant comprising air into said combustion chamber;

c. means for introducing a second reactant comprising a hydrocarbon fuel into said combustion chamber for combustion with said first reactant, and wherein the overall air/fuel ratio includes the range of about 0.8 to 2.0 times that of stoichiometric air/fuel ratio;

d. means for introducing water in the form of a vapor or a vapor/liquid mixture within said combustion chamber at a weight ratio of said water-to-air in the range of about 0.25 to 0.85 whereby the water vapor or vapor/liquid mixture is converted to super-heated vapor by heat transfer through rapid and turbulent mixing with the heated combustion products;

e. means responsive to the mixture of said super-heated vapor and combustion products for converting the energy associated with the mixture to mechanical energy; and f. means for transferring residual thermal energy from said mixture of super-heated vapor and combustion products to said water to thereby preheat the same to a vapor or vapor/liquid mixture prior to its introduction within said combustion chamber.

3. A heat engine as in claim 2 wherein said converting means comprises expander means which includes first and second expanders, and wherein said first expander drives said compressor means and wherein said second expander provides work output, and regulating valve means for providing a variable part of said mixture from said combustion chamber directly to said first expander and means for providing another variable part of said mixture directly to said second expander.

4. A heat engine for converting heat energy to mechanical work comprising:

a. means for converting heat energy from combustion, in the range of about 0.8 to 2.0 times the stoichiometric ratio by weight, of a compressed mixture of air and a hydrocarbon fuel such that the combustion products comprise a first working fluid for the engine cycle;

b. means for converting heat energy by a second working fluid, comprising water, which receives a substantial amount of the heat energy of the first working fluid through turbulent intermixing and undergoes a phase change from vapor or a vapor/-liquid mixture to superheated steam during the operation of the cycle;

c. means for expanding the two working fluids through a mechanical expander to do work;

d. means whereby the ratio of the second and first working fluids is above 0.2 by weight so that the second working fluid acquires greater heat content than the first working fluid; and e. means for recuperating exhaust heat from said intermixed working fluid for pre-heating said second working fluid to the vapor or mixed liquid and vapor form prior to intermixing with the first working fluid.

5. A heat engine as in claim 4. wherein the ratio of the second to first working fluids is in the range of 0.2 to 1.0 by weight.

6. A heat engine comprising:

a. a combustion chamber;

b. compressor means for introducing a first reactant comprising air into said combustion chamber;

c. means for introducing a second reactant comprising a hydrocarbon fuel under pressure into said combustion chamber for combustion with said first reactant wherein the ratio of the first reactant to the second reactant falls within the range of about 0.8 to 2.0 times the stoichiometric ratio by weight;

d. means of introducing a fluid comprising water in a vapor/liquid mixture state into the said heat engine combustion chamber at a ratio of water to the combustion products greater than about 0.2 by weight whereby the said water is converted into superheated steam by heat transfer through rapid and turbulent mixing with the heated combustion products;

e. expander means for converting the energy associated with the mixture to mechanical work;

f. means for utilizing part of the mechanical work generated by said expander means to power said compressor means;

g. means for extracting useful work from said expander means; and h. means for transferring residual thermal energy from said mixture of super-heated vapor and combustion products to said water to thereby preheat the same to a vapor/liquid mixture prior to its introduction within said combustion chamber.

7. A heat engine as in claim 4 wherein the weight ratio of water to combustion products is about 0.2 to 1.0.

8. A heat engine as in claim 4. wherein the weight ratio of water to combustion products is about 0.25 to 0.85.

9. A heat engine as in claim 1 including means for recovering and condensing back water into a liquid from said intermixed working fluid and means wherein non-soluble combustion products are exhausted and water-soluble combustion products are separately removed from the recovered water.

10. A heat engine as in claim 2. including means for recovering and condensing back water into a liquid from said mixture of said superheated vapor and combustion products and means wherein non-soluble combustion products are exhausted and water-soluble combustion products are separately removed from the recovered water.

11. A heat engine as in claim 4. including means for recovering and condensing back water into a liquid from said intermixed working fluid and means wherein non-soluble combustion products are exhausted and water-soluble combustion products are separately removed from the recovered water.

12. A heat engine as in claim 6. including means for recovering and condensing back water into a liquid from said mixture of said superheated vapor and combustion products and means wherein non-soluble combustion products are exhausted and water-soluble combustion products are separately removed from the recovered water.

* * * * *

UNITED STATES PATENT AND TRADEMARK OFFICE

CERTIFICATE OF CORRECTION

PATENT NO. : 3,978,661

DATED : September 7, 1976

INVENTOR(S) : Dah Yu Cheng

It is certified that error appears in the above-identified patent and that said Letters Patent are hereby corrected as shown below:

Column 2, line 10, "gascycle" should be deleted and --gas-cycle-- inserted.

Column 5, line 29, delete "(BRAYTON" and insert --(BRAYTON)--.

Column 12, line 6, delete "3," and insert --3*,--.

Column 12, lines 14-15, delete "$P_1 = P_1$; $P_3 = P_3$; and $T_3 = T_3$." and insert --$P_{1_s} = P_1$; $P_3 = P_{3_s}$; and $T_3 = T_{3_s}$.--

Column 12, lines 17-18, delete "$T_{4*} = T_{4s*}$; $T_4 = T_{4s}$; $P_4 = P_{4_s}$." and insert --$T_4{}^* = T_{4^*_s}$; $T_4 = T_{4_s}$; $P_4 = P_{4_s}$; and $P_4{}^* = P_{4^*_s}$.--

Column 12, line 22, delete "or at $4_s$" and insert --or at $4^*_s$--.

Column 17, line 52, delete "flow of" and insert --flow or--.

Column 18, line 1, delete "$X_{H\ O}$" and insert --$X_{H_2O}$--.

Column 18, line 58, insert --approximately-- after "following".

Column 24, line 4, insert --vapor or-- before "vapor/liquid".

Column 24, line 21, insert --vapor or-- before "vapor/liquid".

Signed and Sealed this

First Day of February 1977

[SEAL]

*Attest:*

RUTH C. MASON
*Attesting Officer*

C. MARSHALL DANN
*Commissioner of Patents and Trademarks*